United States Patent
Tsuchiya

(10) Patent No.: US 7,046,322 B2
(45) Date of Patent: May 16, 2006

(54) TRANSFLECTIVE LCD WITH TILTING DIRECTION OF THE LC MOLECULES BEING OPPOSITE TO EACH OTHER IN THE TWO TRANSMISSIVE DISPLAY AREAS

(75) Inventor: Hitoshi Tsuchiya, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 17 days.

(21) Appl. No.: 10/778,020

(22) Filed: Feb. 17, 2004

(65) Prior Publication Data
US 2004/0212763 A1    Oct. 28, 2004

(30) Foreign Application Priority Data
Mar. 13, 2003  (JP)  ............................. 2003-068338
Nov. 12, 2003  (JP)  ............................. 2003-382827

(51) Int. Cl.
*G02F 1/1335*    (2006.01)
(52) U.S. Cl. .................... 349/114; 349/129; 349/191
(58) Field of Classification Search ................. 349/114
See application file for complete search history.

(56) References Cited

U.S. PATENT DOCUMENTS

| 6,710,837 B1 | 3/2004 | Song et al. | |
| 2002/0149728 A1* | 10/2002 | Ogishima et al. | ........... 349/129 |

FOREIGN PATENT DOCUMENTS

| JP | A 11-242225 | 9/1999 |
| JP | A 2001-042332 | 2/2001 |
| JP | A 2002-055343 | 2/2002 |
| JP | A 2002-287158 | 10/2002 |
| JP | A 2002-350853 | 12/2002 |
| JP | A 2003-167253 | 6/2003 |
| KR | A 1999-0085360 | 12/1999 |

OTHER PUBLICATIONS

Jisaki et al., "Development of transflective LCD for high contrast and wide viewing angle by using homeotropic alignment," Asia Display, IDW, 2001.

* cited by examiner

*Primary Examiner*—Andrew Schechter
*Assistant Examiner*—(Nancy)Thanh-Nhan P Nguyen
(74) *Attorney, Agent, or Firm*—Oliff & Berridge, PLC

(57) ABSTRACT

The invention provides a transflective liquid crystal display device that has less defects, such as incidental images both in reflective display and transmissive display modes, and that has high luminance and high contrast. The liquid crystal display device according to the invention can include a liquid crystal layer sandwiched between a pair of substrates. Each dot area of the display device has a reflective display area and at least two transmissive display areas. The liquid crystal layer can include liquid crystal with negative dielectric anisotropy. The initial alignment state of molecules of the liquid crystal is vertical. An adjusting layer is provided between the liquid crystal layer and one substrate of the pair of substrates. The adjusting layer makes the thickness of the liquid crystal layer different in the reflective display area and the transmissive display area and is provided in the reflective display area. The tilting direction of the liquid crystal molecules is opposite to each other in two adjacent transmissive display areas and the liquid crystal molecules in the reflective display area are in parallel.

4 Claims, 8 Drawing Sheets

|  | A | B | C |
|---|---|---|---|
| EXAMPLE 1 | SLIT | SLIT | SLIT |
| EXAMPLE 2 | SLIT | RIB | SLIT |
| EXAMPLE 3 | SLIT | SLIT | RIB |
| EXAMPLE 4 | SLIT | RIB | RIB |
| EXAMPLE 5 | RIB | SLIT | SLIT |
| EXAMPLE 6 | RIB | RIB | SLIT |
| EXAMPLE 7 | RIB | SLIT | RIB |
| EXAMPLE 8 | RIB | RIB | RIB |

TRANSFLECTIVE LCD WITH TILTING DIRECTION OF THE LC MOLECULES BEING OPPOSITE TO EACH OTHER IN THE TWO TRANSMISSIVE DISPLAY AREAS

BACKGROUND OF THE INVENTION

1. Field of Invention

The present invention relates to a liquid crystal display device and an electronic apparatus. More specifically, the invention relates to a technique achieving a display of a high contrast and a wide viewing angle in a transflective liquid crystal display device which operates in both reflective and transmissive modes.

2. Description of Related Art

In a transflective liquid crystal display device having both a reflective mode and transmissive mode, it is currently known that such a liquid crystal display device can include a liquid crystal layer sandwiched between an upper substrate and a lower substrate, and a reflective film formed of a metal, such as aluminum, having openings for transmitting light, provided on the internal surface of the lower substrate. The reflective film functions as a transflector. In the reflective mode, ambient light incident on the upper substrate passes through the liquid crystal layer, is reflected by the reflective film on the internal surface of the lower substrate, passes through the liquid crystal layer again, exits from the upper substrate, and then reaches the viewer. On the other hand, in the transmissive mode, light incident on the lower substrate from a backlight passes through the liquid crystal layer via an opening in the reflective film, exits from the upper substrate, and then reaches the viewer. Therefore, with regard to the area where the reflective film is formed, the area where the opening is formed constitutes a transmissive display area, and the rest constitutes a reflective display area.

However, the known transflective liquid crystal device has a problem in that the viewing angle in the transmissive display mode is narrow. This is because optical design freedom is restricted. Since the transflector is provided on the internal surface of the liquid crystal cell in order not to produce parallax, reflective display needs to be performed with only one polarizer provided at the viewer side. In order to solve this problem, Japanese Unexamined Patent Application Publication No. 2002-350853 discloses a novel transflective liquid crystal display device using homeotropically aligned liquid crystal. It has the following three characteristics: (1) a "vertical alignment (VA)" mode is adopted where molecules of liquid crystal with negative dielectric anisotropy are aligned vertically with respect to the substrate, and are then tilted by an applied voltage; (2) a "multi-gap structure" is adopted where the thickness of the liquid crystal layer (cell gap) in the transmissive display area is different from that in the reflective display area; and (3) a "multi-domain alignment structure" is adopted. The transmissive display area is a regular octagon or a circle in shape. A projection is provided in the center of the transmissive display area on the opposite substrate so that the liquid crystal molecules are tilted isotropically in the transmissive display area.

SUMMARY OF THE INVENTION

As described above, in connection with the liquid crystal display device of Japanese Unexamined Patent Application Publication No. 2002-350853, a projection can be formed in the center of the transmissive display area to control the alignment direction of the liquid crystal. In application to mobile devices or the like, brighter and high-contrast displays are needed and therefore, transmissive displays are considered more useful than reflective displays. Under such circumstances, the transmissive display area in each dot is becoming larger. However, in the case of an enlarged transmissive display area, there is a possibility that the alignment cannot be controlled completely only by the projection formed in the center of the transmissive display area, as in Japanese Unexamined Patent Application Publication No. 2002-350853. In this case, alignment disorder called "disclination" may occur and cause display defects, such as incidental images. Furthermore, since alignment areas of liquid crystal have different vision properties, non-uniformity such as rough smears will disadvantageously be visible when viewed from an angle. On the other hand, the direction in which the liquid crystal molecules are tilted also needs to be controlled in the reflective display area. Although Japanese Unexamined Patent Application Publication No. 2002-350853 discloses that the alignment in the reflective display area is also controlled by the projection in the center of the transmissive display area, it is hard to say the alignment can be controlled effectively.

The present invention can solve the above problem. It is an object of the present invention to provide a transflective liquid crystal display device that has less defects, such as incidental images both in reflective display and transmissive display modes, that has high luminance and high contrast, and that is particularly suitable for use in an application stressing a transmissive display.

In order to attain the above object, a liquid crystal display device of the present invention can include a liquid crystal layer sandwiched between a pair of substrates. Each dot area of the display device has a reflective display area and at least two transmissive display areas. The liquid crystal layer includes liquid crystal with negative dielectric anisotropy and the initial alignment state of molecules of the liquid crystal is vertical. The display further can include an adjusting layer provided between the liquid crystal layer and at least one substrate of the pair of substrates, the adjusting layer making the thickness of the liquid crystal layer different in the reflective display area, and the transmissive display area and being provided at least in the reflective display area; and an alignment restrictor making the liquid crystal molecules in the transmissive display areas tilted from the inside to the outside of the transmissive display area, the tilting direction of the liquid crystal molecules being opposite to each other in two adjacent transmissive display areas, the alignment restrictor restricting the liquid crystal molecules in the reflective display area so as to be in parallel.

Since this liquid crystal display device has a plurality of the transmissive display areas in one dot area, it has greater transmittance compared with a liquid crystal display device having one transmissive display area in one dot area, and it is ideal for transmissive use.

The liquid crystal display device has the adjusting layer for making the thickness of the liquid crystal layer different in the reflective display area and the transmissive display area, and the retardation difference between the reflective display area and the transmissive display area is reduced. In other words, in the reflective display area, the light incident on the front surface passes through the liquid crystal layer twice before reaching the viewer while in the transmissive display area, the light incident on the back surface passes through the liquid crystal layer once before reaching the viewer. Therefore, a retardation difference occurs between the reflective display area and the transmissive display area.

The present invention reduces the retardation difference by forming the adjusting layer, and keeps the contrast from falling.

The liquid crystal display device of the present invention can have a liquid crystal layer formed of liquid crystal with negative dielectric anisotropy and the initial alignment state of molecules of the liquid crystal is vertical. The tilting direction of the liquid crystal molecules is restricted by the alignment restrictor. Therefore, alignment disorder hardly ever occurs, and defects caused by alignment disorder, such as incidental images, hardly ever occur. In other words, the tilting direction of the liquid crystal molecules is opposite to each other in two adjacent transmissive display areas in one dot area, and the liquid crystal molecules in the reflective display area are restricted so as to be in parallel. Therefore, even in the case of a greater transmittance, multi-domain alignment control is performed completely. In both the reflective display area and the transmissive display area, display defects caused by the alignment disorder are prevented. In the present invention, the sum of the transmissive display areas is greater than the reflective display area. Therefore, the liquid crystal display device is much more suitable for a display portion of electronic devices with emphasis on transmissive display.

In connection with a liquid crystal display device of the present invention, the adjusting layer may have a slope in the vicinity of the boundary between the reflective display area and the transmissive display area. An electrode for driving the liquid crystal may be provided on each internal surface of the pair of substrates. In this case, as the alignment restrictor, a slit opening and/or projection may be formed in the electrode. The tilting direction of the liquid crystal molecules is thereby restricted.

By forming the slit opening in the electrode, the electric field (potential line) generated between the electrodes on the pair of substrates tilts in the vicinity of the opening. By the effect of this oblique electric field, the alignment of the liquid crystal is easily controlled. When a projection is formed on the electrode, the alignment direction of the liquid crystal is controlled by the effect of the projection projecting in the liquid crystal layer. By the combination of these, the tilting direction of the liquid crystal molecules is made opposite to each other in two adjacent transmissive display areas, and the liquid crystal molecules in the reflective display area are restricted so as to be in parallel.

In the configuration of the present invention, the adjusting layer can exist in the boundary between the transmissive display area and the reflective display area. Therefore, the transmissive display area is surrounded by the slopes of the adjusting layer. In connection with the transmissive display area, the opening and/or projection is preferably formed substantially in the central portion and in the vicinity the boundary of the transmissive display area.

Specifically, in a first transmissive display area of the two adjacent transmissive display areas, preferably, the substrate with the adjusting layer has an opening in the electrode on the slope of the adjusting layer, and the other substrate has an opening or a projection in the electrode substantially in the central portion of the first transmissive display area. In this case, the tilting direction of the liquid crystal molecules can be restricted so as to be from the opening or projection formed substantially in the central portion of the first transmissive display area toward the slopes. The alignment restrictor on the slopes is limited to an opening, because it is difficult in manufacturing to form a projection.

On the other hand, in a second transmissive display area of the two adjacent transmissive display areas, the substrate with the adjusting layer has an opening or a projection in the electrode substantially in the central portion of the second transmissive display area, and the other substrate has an opening or a projection of the electrode in the portion corresponding to the slope of the adjusting layer. In this case, the tilting direction of the liquid crystal molecules is opposite to each other in two adjacent transmissive display areas (the tilting directions are different as seen from the centers of these areas. In the reflective display area formed between the transmissive display areas, the tilting direction of the liquid crystal molecules is restricted to one direction by the opening formed on one slope and the opening or projection formed in the portion corresponding to the other slope. Therefore, it is possible to suppress display defects caused by alignment disorder of the liquid crystal molecules, while being consistent with the high-transmittance requirements. Accordingly, a liquid crystal display device with high luminance and high contrast is achieved.

In the present invention, it is noted that to provide an opening in the electrode or a projection in the electrode at locations corresponding to the slope of the adjusting layer can mean to provide an opening or a projection at locations overlapping at least partially with the slope of the adjusting layer in plane view.

An electronic apparatus of the present invention can be characterized in that it includes a liquid crystal display device of the present invention. By this configuration, it becomes possible to provide an electronic apparatus including a liquid crystal display device that is bright and that has high contrast and wide viewing angle regardless of environment. In particular, the electronic apparatus of the present invention is ideal for electronic devices with emphasis on transmissive display.

BRIEF DESCRIPTION OF THE DRAWINGS

The invention will be described with reference to the accompanying drawings, wherein like numerals reference like elements, and wherein.

DETAILED DESCRIPTION OF PREFERRED EMBODIMENTS

The first embodiment of the present invention will now be described with reference to FIGS. 1 to 3. The liquid crystal display device of this embodiment is an active matrix liquid crystal display device having a thin film transistor (TFT) functioning as a switching element.

Figure 1:
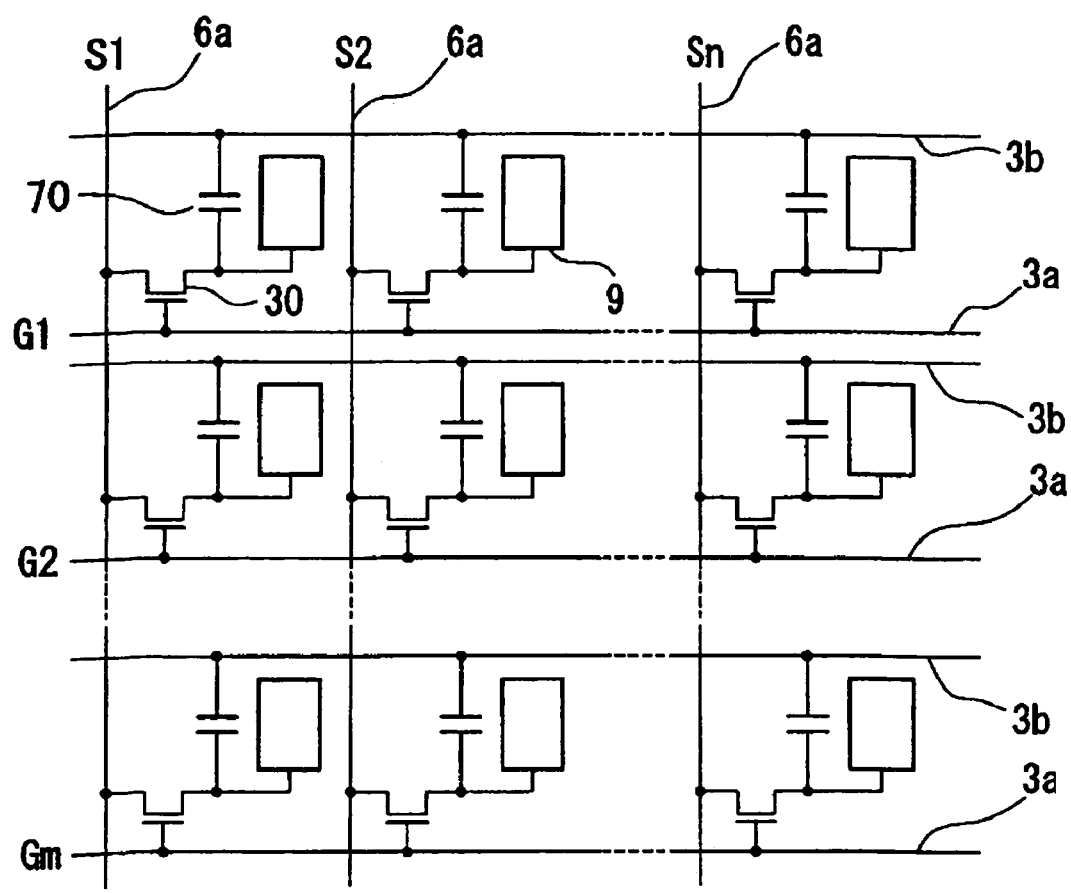
FIG. 1 is an exemplary circuit diagram of a liquid crystal display device of a first embodiment.

FIG. 1 is an exemplary circuit diagram of a plurality of dots arranged in a matrix and forming an image display area of the liquid crystal display device of this embodiment. FIG. 2 is a plan view showing the structure of a dot in a TFT array substrate. FIG. 3 is a sectional view showing the structure of the liquid crystal display device. FIG. 3 is a sectional view taken along line A–A' of FIG. 2. Note that the layers and elements in the drawings vary in scale for the sake of convenience.

As shown in FIG. 1, the liquid crystal display device of this embodiment has pixel electrodes 9 and TFTs 30 functioning as switching elements for controlling the pixel electrodes 9 in a plurality of dots which constitute the display area and are disposed in a matrix. Data lines 6a supplied with image signals are electrically connected to sources of the TFTs 30. The image signals S1, S2, . . . , Sn written to the data lines 6a are supplied in this order line-by-line, or are supplied in groups to a plurality of adjacent data lines 6a. Scanning lines 3a are electrically connected to gates of the TFTs 30. Pulsed scanning signals G1, G2, . . . , Gm are applied to a plurality of the scanning lines 3a with a predetermined timing line-by-line. The pixel electrodes 9 are electrically connected to drains of the TFTs 30. By switching the TFTs 30 functioning as switching elements "on" for a certain period, the image signals S1, S2, . . . , Sn from the data lines 6a are written in the liquid crystal with a predetermined timing.

The predetermined level of image signals S1, S2, . . . , Sn written in the liquid crystal via the pixel electrodes 9 are held between the pixel electrodes and a common electrode, which will be described later, for a certain period. The liquid crystal modulates light and allows to display a grayscale by changing the alignment or order of molecular association according to the applied voltage level. Here, in order to prevent leakage of the held image signals, storage capacitors 70 are added in parallel with the liquid crystal capacitance formed between the pixel electrodes 9 and the common electrode. The reference character 3b represents a capacitor line.

The planar structure of a TFT array substrate constituting the liquid crystal display device of this embodiment will now be described with reference to FIG. 2. As shown in FIG. 2, a plurality of the rectangular pixel electrodes 9 (the outline of which is shown by dotted line 9A) are provided in a matrix on the TFT array substrate 10. The data line 6a, the scanning line 3a, and the capacitor line 3b are provided along the boundary of each pixel electrode 9. In this embodiment, a dot area is the area surrounded by two data lines 6a, a scanning line 3a, and a capacitor line 3b, in which a pixel electrode 9 is formed. The dot areas are disposed in a matrix and can perform display operate independently.

A semiconductor layer 1a constitutes the TFT 30 and is formed of, for example, a polysilicon film. The data line 6a is electrically connected to a source area of the semiconductor layer 1a, which will be described later, via a contact hole 5. The pixel electrode 9 is electrically connected to a drain area of the semiconductor layer 1a, which will be described later, via a contact hole 8. The scanning line 3a is disposed so as to be opposite to a channel area (the left hatched area of FIG. 2) of the semiconductor layer 1a. The scanning line 3a functions as a gate electrode in a portion opposite to the channel area.

Figure 2:
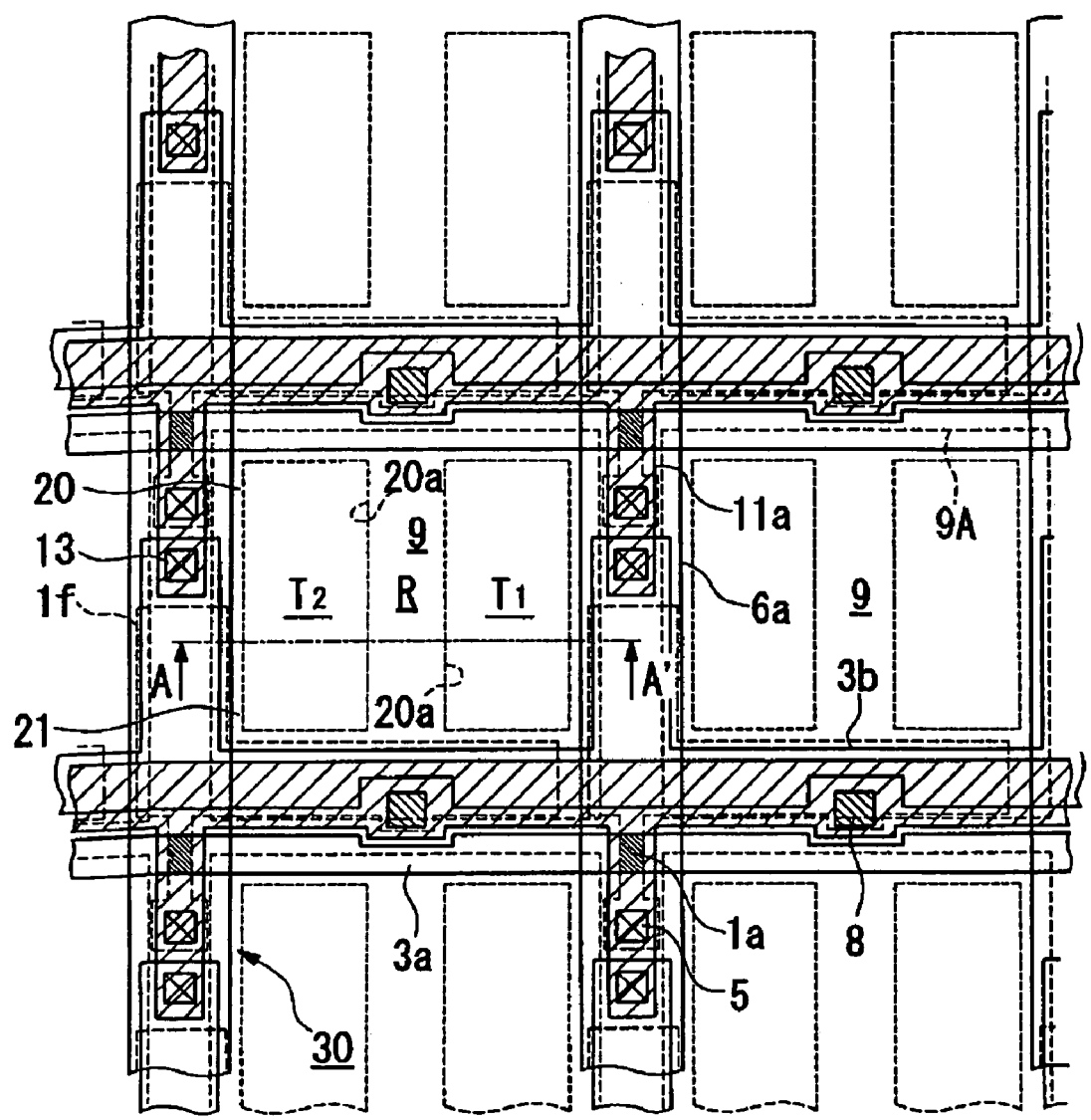
FIG. 2 is a plan view showing the structure of a dot of the liquid crystal display device of the first embodiment.

The capacitor line 3b has a main line portion which extends straight along the scanning line 3a (that is to say, a first area formed along the scanning line 3a in plane view), and a projecting portion which projects upward in FIG. 2 from a place where the capacitor line 3b crosses the data line 6a (that is to say, a second area formed along the data line 6a in plane view). In the right-hatched areas of FIG. 2, a plurality of first light shielding films 11a are provided. The first light shielding films 11a is electrically connected to the capacitor line 3b via a contact hole 13.

In one dot area, a reflective film 20 with two openings 20a, 20a is formed. The area where the reflective film 20 is formed is a reflective display area R. The areas (inside the openings 20a) where the reflective film 20 is not formed are transmissive display areas T1 and T2. An insulating film 21 (adjusting layer), which has a frame shape of rectangle, is formed so as to overlap the reflective film 20 in plane view. In this embodiment, the insulating film 21 has slopes 21a (see FIG. 3). In this specification, these slopes are defined as the boundaries between the reflective display area R and the transmissive display areas T1 and T2.

The cross-sectional structure of the liquid crystal display device of this embodiment will now be described with reference to FIG. 3. FIG. 3 is a sectional view taken along line A–A' of FIG. 2. The present invention can be characterized by the configuration of the insulating film and the electrode. Since the cross-sectional structure of the TFT, the wiring and the like is known, an illustration and description thereof will be omitted.

Figure 3:
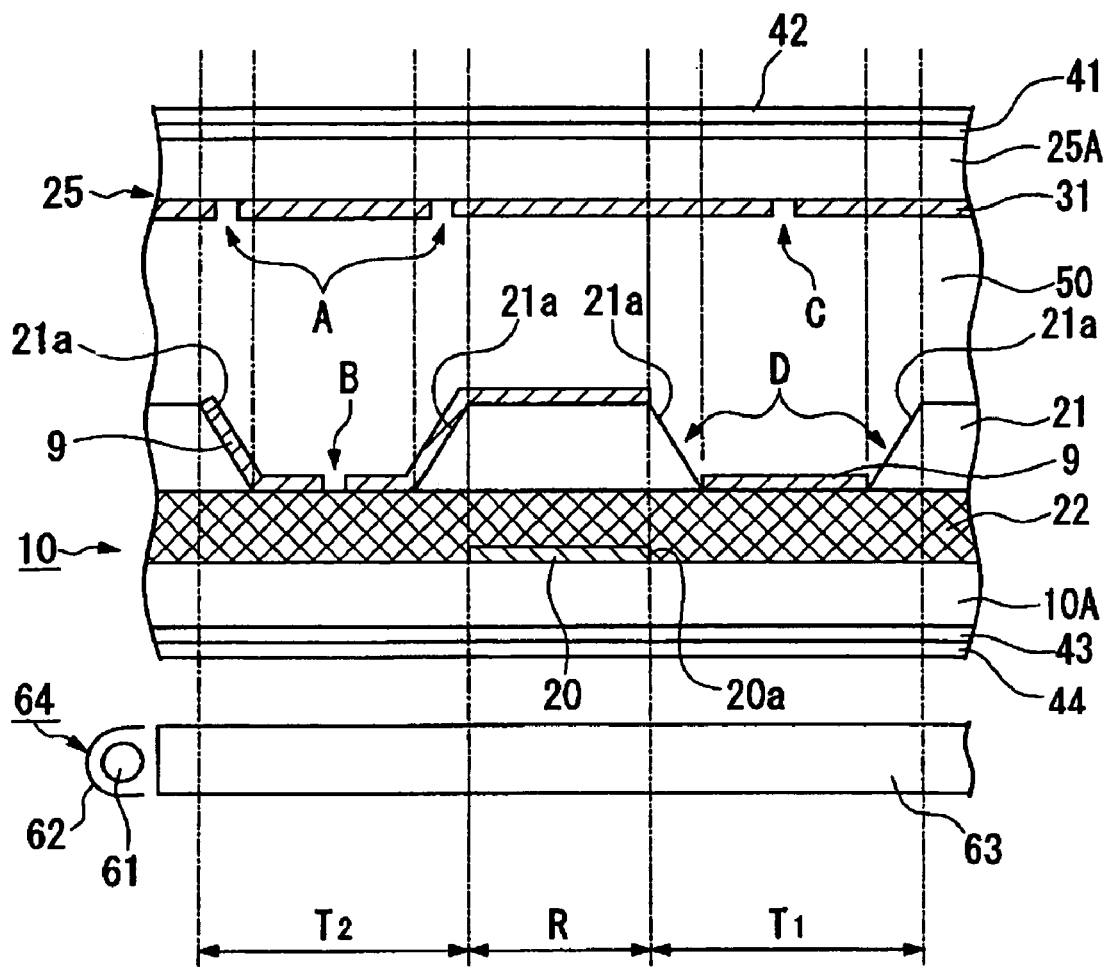
FIG. 3 is a sectional schematic view showing the essential part of the liquid crystal display device of the first embodiment.

As shown in FIG. 3, the liquid crystal display device of this embodiment has a liquid crystal layer 50 sandwiched between the TFT array substrate 10 and the opposite substrate 25, which is disposed opposite the TFT array substrate 10. The liquid crystal layer 50 is formed of liquid crystal with negative dielectric anisotropy and the initial alignment state of molecules of the liquid crystal is vertical. The TFT array substrate 10 is composed of a substrate body 10A and a reflective film 20 formed thereon. The substrate body 10A is formed of a transparent material, such as glass and quartz. The reflective film 20 is formed of a metal with high reflectivity, such as aluminum and silver. As described above, the area in which the reflective film 20 is formed becomes the reflective display area R and the areas in which the reflective film 20 is not formed become the transmissive display areas T1 and T2.

A pigment layer 22 constituting a color filter is provided on the reflective film 20 in the reflective display area R and on the substrate body 10A in the transmissive display areas T1 and T2. A pixel includes three adjacent dot areas that have red (R), green (G), and blue (B) pigment layers 22, respectively. Alternatively, in order to compensate for differences in chromaticity between the reflective display and the transmissive display, pigment layers having different color-saturations may be provided separately for the reflective display area R and the pigment layer for the transmissive display area T1 (T2).

The insulating film 21 is formed on the pigment layer 22 of the color filter in the place corresponding to the reflective display area R. The insulating film 21 is formed of an organic film such as acrylic resin which has a thickness of approximately two micrometers plus or minus one micrometer. In the vicinity of the boundary between the reflective display area R and the transmissive display area T1 (T2), the insulating film 21 has a slope 21a so as to vary continuously in thickness. Since the liquid crystal layer 50 has a thickness of approximately two to six micrometers in the portion where the insulating film 21 does not exist, the thickness of the liquid crystal layer 50 in the reflective display area R is nearly half of the thickness of the liquid crystal layer 50 in the transmissive display area T1 (T2). The insulating film 21 functions as an adjusting layer. That is to say, the thickness of the insulating film 21 makes the thickness of the liquid crystal layer 50 in the reflective display area R different from the thickness of the liquid crystal layer 50 in the transmissive display area T1 (T2). In this embodiment, the edge of the flat portion of the insulating film 21 almost corresponds to the edge of the reflective film 20 (reflective display area). Therefore, the slopes 21a are included in the transmissive display area T.

The pixel electrode 9 is formed on the surface of the TFT array substrate 10 including the surface of the insulating film 21. The pixel electrode 9 is formed of a transparent conductive film, for example, indium tin oxide (hereinafter referred to as ITO). An alignment film (not shown) is formed on the pixel electrode 9. The alignment film is formed of, for example, polyimide.

On the other hand, the opposite substrate 25 is composed of a substrate body 25A, a common electrode 31 formed thereon, and an alignment film (not shown) formed further thereon. The substrate body 25A is formed of a transparent material, such as glass and quartz. The common electrode 31 is formed of a transparent conductive film, for example, ITO. The alignment film is formed of, for example, polyimide. Both the alignment films (not shown) on the TFT array substrate 10 and the opposite substrate 25 are processed for vertical alignment, however, not subjected to a pre-tilting process, such as rubbing.

At the external side of the TFT array substrate 10, a retardation film 43 is provided on the substrate body, and a polarizer 44 is provided on the retardation film 43. At the external side of the opposite substrate 25, a retardation film 41 is provided on the substrate body, and a polarizer 42 is provided on the retardation film 41. The retardation films 43 and 41 have phase difference of approximately ¼ wavelength with respect to the wavelength of the visible light. By combinations of the retardation films 43 and 41 and the polarizers 44 and 42, substantially circularly polarized light is incident on the liquid crystal layer 50 from both the TFT array substrate 10 side and the opposite substrate 25 side. At the external side of the liquid crystal cell, which is the TFT array substrate 10 side of the liquid crystal cell, a backlight 64 is provided. The backlight 64 has a light source 61, a reflector 62, and a light guide substrate 63.

The liquid crystal display device of this embodiment has slits at predetermined places of the pixel electrode 9 and the common electrode 31 in order to restrict the alignment of the liquid crystal molecules in the liquid crystal layer 50. Specifically, in connection with the pixel electrode 9, slits are formed in areas D that are in the transmissive display area T1 and that correspond to the slopes 21a of the insulating film 21. Slits are also formed in the vicinity of the central portion B of the transmissive display area T2. On the other hand, in connection with the common electrode 31, slits are formed in the vicinity of the central portion C of the transmissive display area T1. Slits are also formed in the areas A that are in the transmissive display area T2 and that correspond to the slopes 21a of the insulating film 21, that is to say the area located above the slopes 21a. Therefore, due to the effect of the slits disposed in the vicinity of the central portions of the transmissive display areas T1 and T2, the liquid crystal molecules tilt radially, for example, from the inside to the outside of the transmissive display area and radiate from the slits.

Since such a liquid crystal display device has the insulating film 21 in the reflective display area R, the thickness of the liquid crystal layer 50 of the reflective display area R is nearly half of the thickness of the liquid crystal layer 50 of the transmissive display area T. Therefore the retardation contributing to reflective display and the retardation contributing to transmissive display are practically equal. Therefore, high contrast is achieved.

Figure 4:
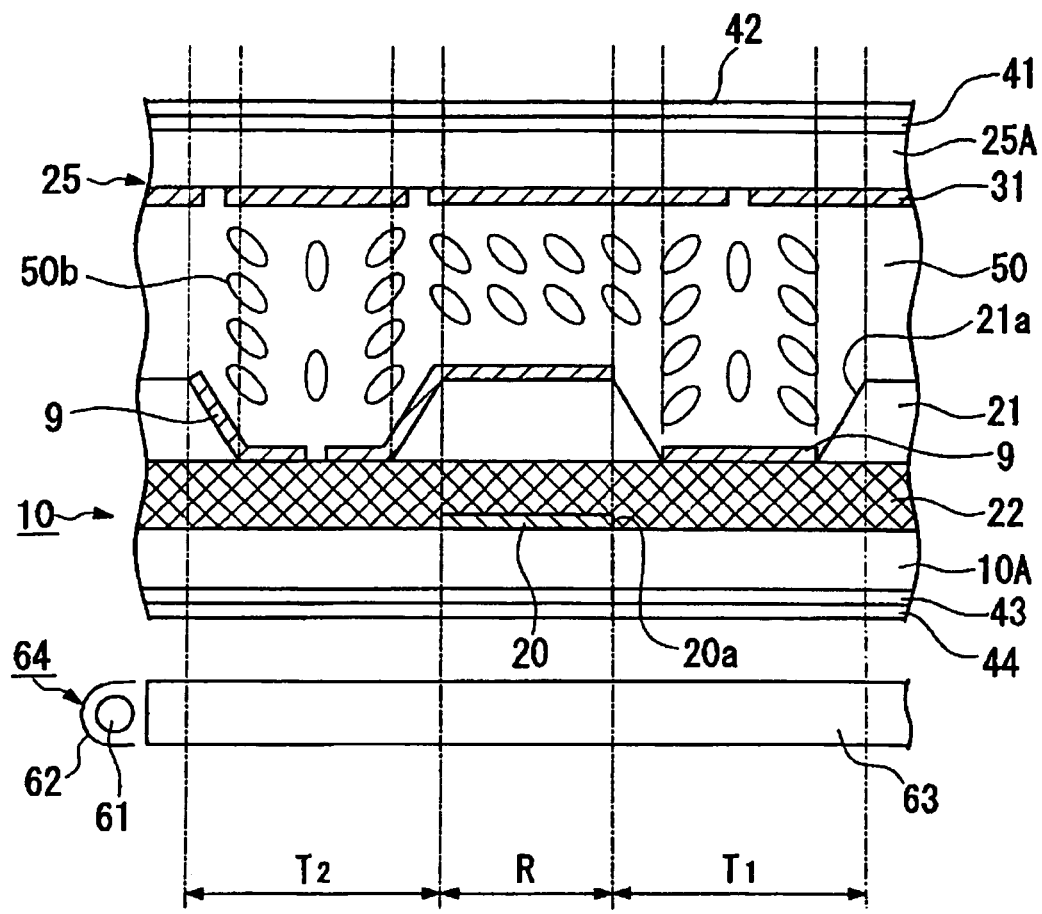
FIG. 4 is an illustration showing the operation of the liquid crystal display device of the first embodiment.

Further, since a plurality of transmissive display areas are formed in one pixel, a sufficient transmittance ratio is achieved. When a plurality of the transmissive display area are formed as described above, in the two adjacent transmissive display areas T1 and T2 in each dot area, electrode slits are formed in the central portions B and C, and the portions A and D corresponding to the slopes. The slits of the area T1 and the slits of the area T2 are formed alternately on the different substrates. Therefore, as shown in FIG. 4, the tilting direction of the liquid crystal molecules in the area T1 is opposite to that of the liquid crystal molecules in the area T2. For example, when seen from the opposite substrate 25, in the area T1, each molecule is highest in the center of the area T1 and gets lower toward the edges. On the contrary, in the area T2, each molecule is lowest in the center of the area T2 and gets higher toward the edges. In addition, in the reflective display area, the liquid crystal molecules are restricted so as to be in parallel. In other words, since the slits are formed in the electrode, the electric field applied between the upper and lower electrodes is tilted. Due to the effect of the oblique electric field, the alignment direction of the liquid crystal molecules can be controlled. Places where slits are formed (the central portion and the slope) and electrode where slits are formed (the pixel electrode or the common electrode) are alternately arranged for every two adjacent areas T1 and T2. Therefore, in the reflective display area R between the areas T1 and T2, the liquid crystal molecules are restricted so as to be in parallel.

Since the disclination which causes incidental images and non-uniformity, such as rough smears when viewed from an angle, is suppressed in the liquid crystal display device of this embodiment, high-quality display with less incidental images, and less non-uniformity is achieved. Therefore, according to the effects described above, a display without bright defects and with high-contrast and wide viewing angle (the contrast ratio is greater than or equal to 10:1 in a 160-degree cone) is achieved.

Figure 5:
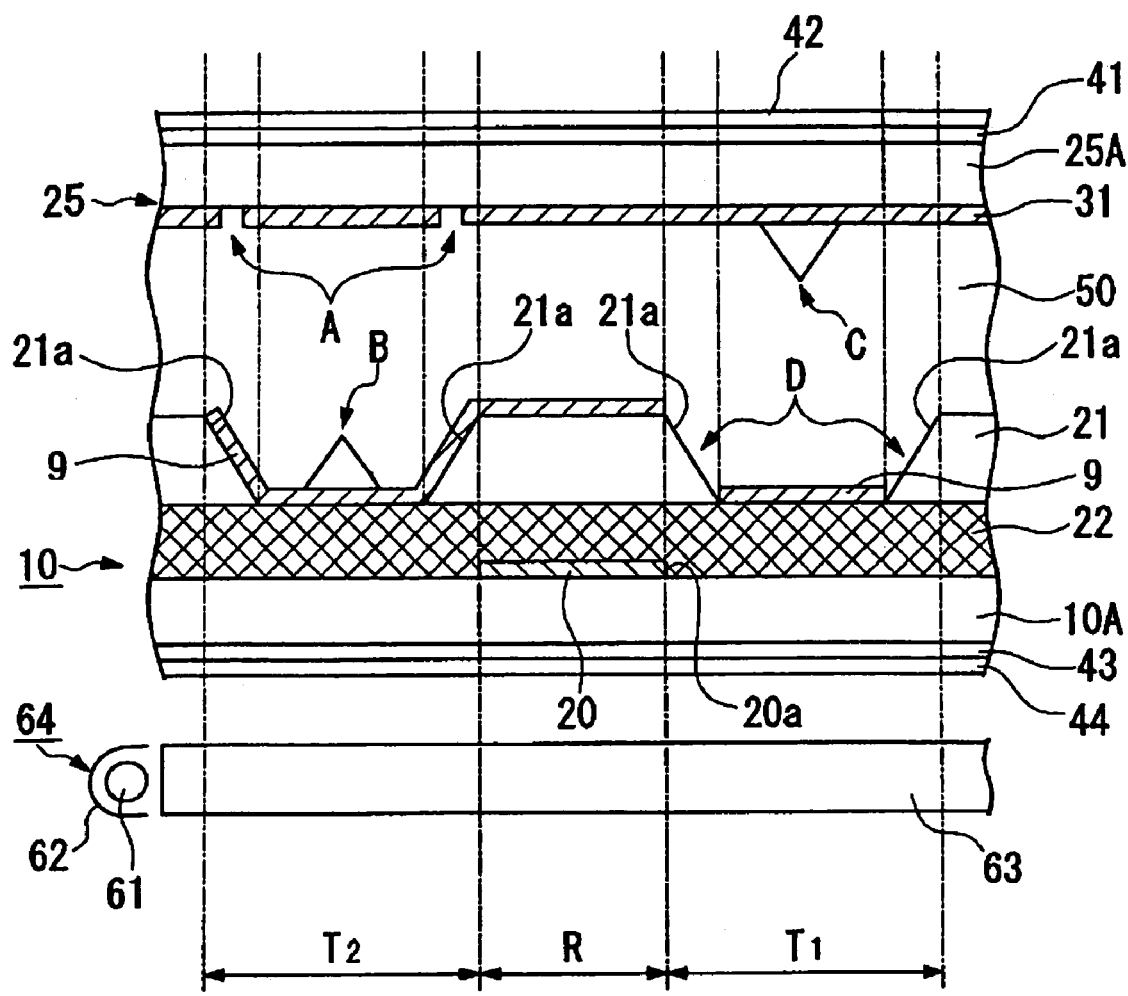
FIG. 5 is a sectional schematic view showing the essential part of the liquid crystal display device of a second embodiment.

A second embodiment of the present invention will now be described with reference to FIG. 5. FIG. 5 is a sectional view showing a liquid crystal display device of this embodiment. Since the basic configuration of the liquid crystal display device of this embodiment is almost the same as the first embodiment, the same reference numerals will be used in FIG. 5 to designate the same components as in FIG. 3, and a detailed description will be omitted.

In this embodiment, as shown in FIG. 5, a rib (projection) of triangular cross-section is formed on the pixel electrode 9 in the vicinity of the central portion B of the transmissive display area T2. Another rib (projection) of triangular cross-section is formed on the common electrode 31 in the vicinity of the central portion C of the transmissive display area T1. These ribs are formed of a dielectric material such as acrylic resin. Their planar shape is almost the same shape as the planar shape of the slits of the first embodiment. Alignment films (not shown) are formed so as to cover the electrodes 9 and 31 and the ribs thereon. On the other hand, in connection with the areas D that are in the transmissive display area T1 and corresponding to the slopes 21a, slits are formed in the pixel electrode 9 as in the first embodiment. In connection with the areas A that are in the transmissive display area T2 and above the slopes 21a, slits are formed in the common electrode 31 as in the first embodiment.

Figure 6:
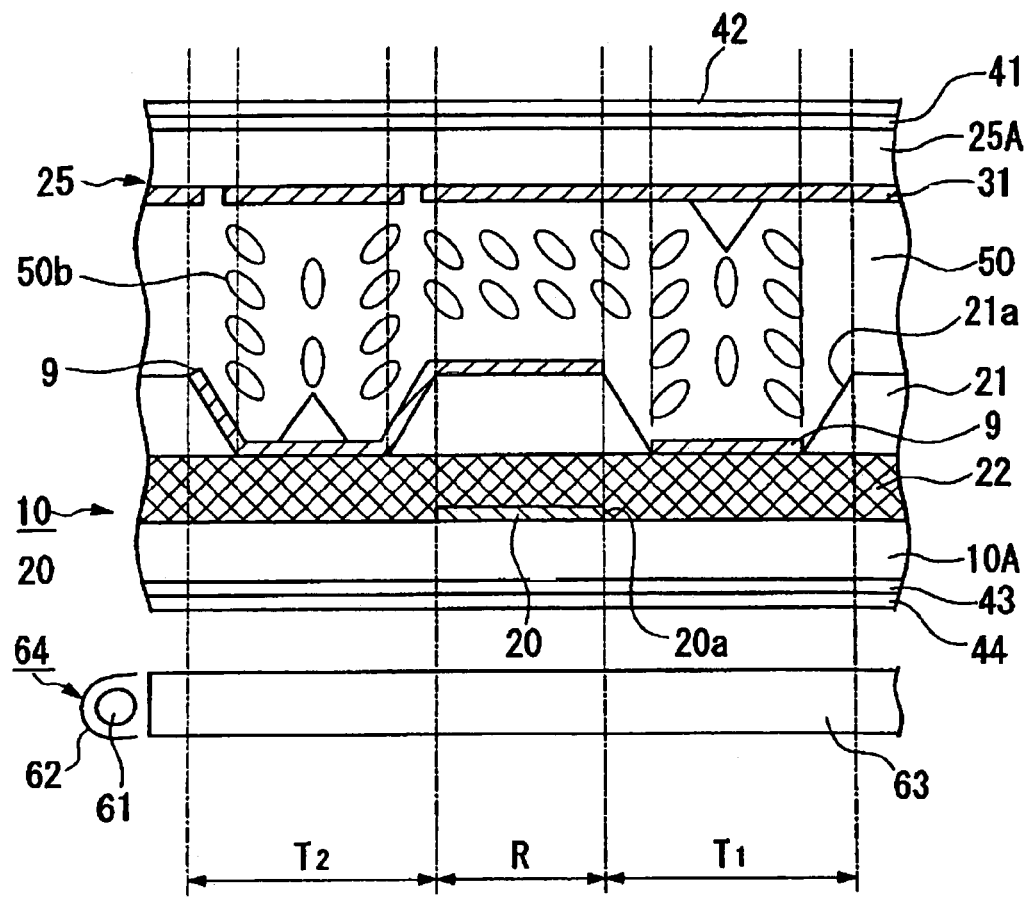
FIG. 6 is an illustration showing the operation of the liquid crystal display device of the second embodiment.

The liquid crystal display device of this embodiment has the ribs projecting in the liquid crystal layer 50 in the areas B and C, instead of the slits in the first embodiment. Also in this case, as shown in FIG. 6, the liquid crystal molecules 50b are controlled to align along the slopes of the ribs. That is to say, in case of this embodiment again, the alignment direction of the liquid crystal molecules 50b is controlled as in the first embodiment. Therefore, a display without bright defects and with high-contrast and wide viewing angle is achieved.

The first embodiment and the second embodiment of the present invention are described as above. In connection with the areas A and C shown in FIG. 3, by forming either a slit or a rib in the common electrode 31, the alignment of the liquid crystal molecules 50b (see FIG. 4 or FIG. 6) can be restricted in the similar direction. Also, in connection with the area B shown in FIG. 3, by forming either a slit or a rib in the pixel electrode 9, the alignment of liquid crystal molecules 50b (see FIG. 4 or FIG. 6) can be restricted in the similar direction. However, in connection with the areas D shown in FIG. 3, since it is difficult to form a rib on the slope, a slit is formed in the pixel electrode 9.

Figures 7, 8:
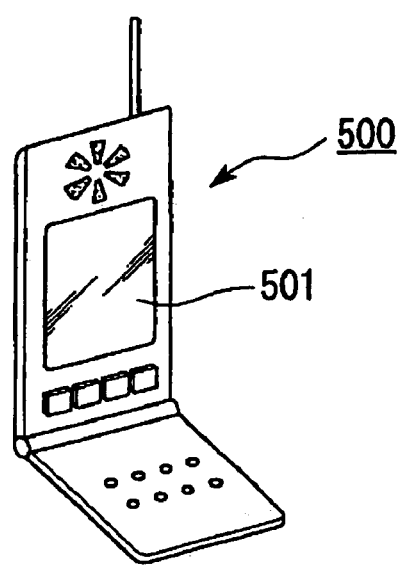
FIG. 7 is a table showing embodiment examples of the present invention.
FIG. 8 is a perspective view showing an example of an electronic apparatus of the present invention.

As described above, in connection with the areas A, B, and C shown in FIG. 3, by forming either a slit or a rib in the electrodes, a display without bright defects and with high-contrast and wide viewing angle is achieved. That is, as shown in FIG. 7, by choosing between a slit and a rib for the areas A, B, and C, liquid crystal display devices of examples 1 to 8 are achieved. In either case, the same effects as in the above embodiments are achieved. The first embodiment corresponds to example 1 in FIG. 7. The second embodiment corresponds to example 4 in FIG. 7.

In the first embodiment and the second embodiment, means of restricting the alignment of the liquid crystal molecules in one pixel electrode 9 is described. However, since a gap (where no electrodes are formed) is formed between adjacent pixel electrodes 9 and 9, if a common electrode 31 covering the entire surface of the substrate is used, an oblique electric field is produced between the portion where no pixel electrodes 9 are formed and the common electrode 31. Especially in the reflective display area R shown in FIG. 4, if an oblique electric field, which restricts orientation of the liquid crystal molecules in the direction crossing the tilting direction of the liquid crystal molecules, is produced, alignment restriction, which is the aim of the embodiments, that is to say, arranging the liquid crystal molecules in parallel in the reflective display area R, may not be advantageously achieved.

Therefore, in the first embodiment and the second embodiment, slits (openings) are formed in portions of the common electrode 31 which planarly overlap with the gap (where no electrode is formed) between the pixel electrodes 9 and 9 in the reflective display area R. Specifically, electrode slits as shown in FIG. 9 are formed.

Figure 9A:
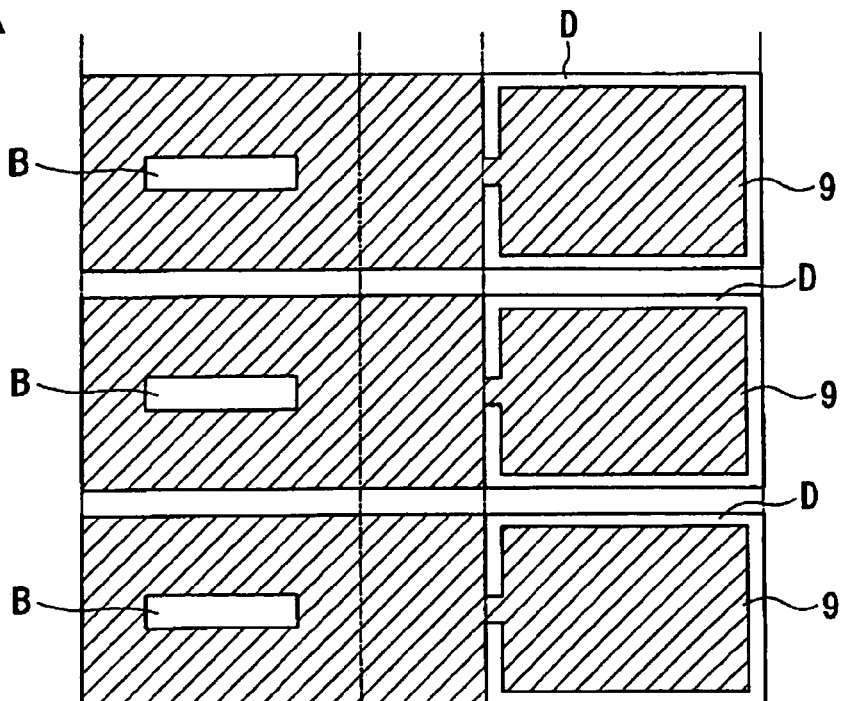
FIG. 9 is a schematic view showing the planar structure of pixel electrodes and a common electrode.
Figure 9B:
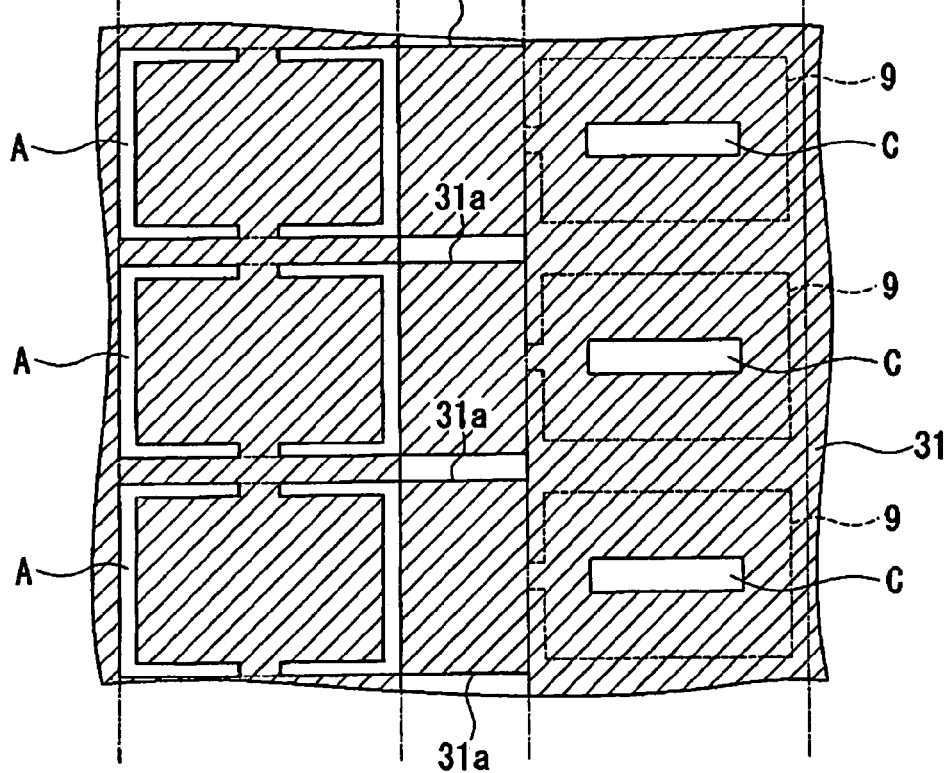

FIG. 9(a) is a plan schematic view of the pixel electrodes 9. FIG. 9(b) is a plan schematic view of the common electrode 31. In FIG. 9(b), the pixel electrodes 9 planarly overlapping with the common electrode 31 are shown by dotted lines. In the reflective display area R of each embodiment, the alignment of liquid crystal molecules is restricted to the longitudinal direction of the pixel electrode 9 shown in FIG. 9.

As shown in FIG. 9(b), slits (openings) 31a are formed partially in the common electrode 31 of each embodiment described above. The slits 31a are formed in the reflective display area R. Additionally, the slits 31a planarly overlap with the gap (where no electrodes are formed) between the pixel electrodes 9 and 9.

The above configuration prevents an oblique electric field caused by the gap (where no electrodes are formed) between the pixel electrodes 9 and 9 in the reflective display area R, thereby ensuring alignment restriction. Therefore, the problem of an oblique electric field caused by the gap between the pixels making the alignment restricting force extend in the direction perpendicular to the alignment direction of the liquid crystal molecules in the reflective display area R across the length of the pixel electrode 9 of FIG. 9(a), that is to say, across the width of the pixel electrode 9 of FIG. 9(a), hardly ever occurs.

An electronic apparatus including the liquid crystal display device of the above embodiments of the present invention will now be described. FIG. 8 is a perspective view showing an example of a cellular phone. In FIG. 8, reference numeral 500 represents a cellular phone body, and reference numeral 501 represents a display portion including the above liquid crystal display device.

Since the electronic apparatus shown in FIG. 8 has a display portion including a liquid crystal display device according to the above embodiments, it is an apparatus including a liquid crystal display device which provides a bright, high-contrast and wide-viewing-angle display regardless of use environment. Since it can achieve a bright and high-contrast display especially in the transmissive display mode, it can be provided as an electronic apparatus with emphasis on transmissive display.

It should be understood that the present invention is not limited to the above-described embodiments, and various changes may be made therein without departing from the spirit of the present invention. For example, in the above embodiments, the present invention is applied to an active matrix liquid crystal display device including TFTs as switching elements, however, the present invention may be applied to an active matrix liquid crystal display device including thin film diodes (TFDs) as switching elements, and to a passive matrix liquid crystal display device. The specific description concerning material, size, and shape of each component can be varied or modified as appropriate.

Although the retardation films 41 and 42 are single films in the above embodiment, alternatively, they may be a layered film of a ½ wavelength film and a ¼ wavelength film. This layered film functions as a broadband circular polarizer, and makes black more achromatic. Adding a negative C-plate to this layered film achieves wider viewing angle. The C-plate is a retardation film whose optical axis is aligned in the thickness direction.

Further, in the above embodiments, the insulating film 21 functioning as an adjusting layer is formed on the substrate body (the lower substrate) 10A of the TFT array substrate 10. However, it may be formed on the substrate body (the upper substrate) 25A of the opposite substrate 25. In the above embodiments, the color filter (colored layer 22) is formed on the substrate body (the lower substrate) 10A of the TFT array substrate 10. However, it may be formed on the substrate body (the upper substrate) 25A of the opposite substrate 25.

Thus, while the invention has been described in conjunction with specific embodiments thereof, it is evident that many alternatives, modifications and variations will be apparent to those skilled in the art. Accordingly, preferred embodiments of the invention as set forth herein are intended to be illustrative, not limiting. Various changes may be made without departing from the spirit and scope of the invention.

What is claimed is:

1. A liquid crystal display device, comprising:
   a pair of substrates;
   a liquid crystal layer sandwiched between the pair of substrates, the liquid crystal layer including liquid crystal with negative dielectric anisotropy;
   dot areas, each dot area having a reflective display area and at least two transmissive display areas;
   an adjusting layer provided between the liquid crystal layer and at least one substrate of the pair of substrates, the adjusting layer making a thickness of the liquid crystal layer different in the reflective display area and the transmissive display areas and being provided at least in the reflective display area;
   an alignment restrictor making the liquid crystal molecules in the transmissive display areas tilt, the tilting direction of the liquid crystal molecules being opposite to each other in the two transmissive display areas, the alignment restrictor making liquid crystal molecules of the liquid crystal layer tilt in the same direction in the reflective display areas;
   a first transmissive display area and a second transmissive display area of the at least two transmissive display areas being adjacent to, and sandwiching, the reflective display area, the first transmissive display area having a first portion adjacent to a first side of the reflective display area, the second transmissive display area having a second portion adjacent to a second side of the reflective display area opposite to the first side of the reflective display area, and
   the tilting direction of the liquid crystal molecules being opposite to each other in the first and second portions.

2. The liquid crystal display device according to claim 1, the adjusting layer having a slope in the vicinity of a boundary between the reflective display area and the transmissive display areas;
   an electrode that drives the liquid crystal being provided on each internal surface of the pair of substrates; and
   the alignment restrictor having at least one of a slit opening and a projection formed in the electrode.

3. A liquid crystal display device, comprising:
   a pair of substrates;
   a liquid crystal layer sandwiched between the pair of substrates, the liquid crystal layer including liquid crystal with negative dielectric anisotropy;
   dot areas, each dot area having a reflective display area and at least two transmissive display areas;
   an adjusting layer provided between the liquid crystal layer and at least one substrate of the pair of substrates, the adjusting layer making a thickness of the liquid crystal layer different in the reflective display area and the transmissive display areas and being provided at least in the reflective display area; and
   an alignment restrictor making the liquid crystal molecules in the transmissive display areas tilt, the tilting direction of the liquid crystal molecules being opposite to each other in the two transmissive display areas, the alignment restrictor making liquid crystal molecules of the liquid crystal layer tilt in the same direction in the reflective display areas;
   the adjusting layer being provided between the liquid crystal layer and one substrate of the pair of substrates;
   in a first transmissive display area of two transmissive display areas in each dot area, the substrate with the adjusting layer has an opening in the electrode on the slope of the adjusting layer, and the other substrate has an opening or a projection in the electrode in a substantially central portion of the first transmissive display area; and
   in a second transmissive display area of the two transmissive display areas in each dot area, the substrate with the adjusting layer has an opening or a projection in the electrode in a substantially central portion of the second transmissive display area, and the other substrate has an opening or a projection in the electrode in a portion corresponding to a slope of the adjusting layer.

4. An electronic apparatus including the liquid crystal display device according to claim 1.

* * * * *